Sept. 14, 1965   J. H. BROSEKE   3,205,978

BRAKE HAVING CONCENTRICALLY MOUNTED SHOES

Filed Jan. 22, 1963

INVENTOR
*John H. Broseke.*

United States Patent Office 3,205,978
Patented Sept. 14, 1965

3,205,978
BRAKE HAVING CONCENTRICALLY
MOUNTED SHOES
John H. Broseke, R.R. 1, Hepburn Road, Kenton, Ohio
Filed Jan. 22, 1963, Ser. No. 253,126
2 Claims. (Cl. 188—78)

This invention relates to automotive vehicles and the like, and more particularly to that part of the vehicle known as its brake.

While there are admittedly any number of good brakes for automotive vehicles in daily use, none to date has been produced that has as many major advantages as this invention, the principal object of which is to provide a brake for either air or hydraulic operation.

Another object of this invention is to provide a brake for automotive vehicles and the like that has greater braking surface than any other brake of the same diameter.

Another object of this invention is to provide a brake that has positive acting mechanism acting directly onto the shoes.

Another object of this invention is to provide a brake for automotive vehicles and the like having a minimum number of parts that results in a more efficient mechanism with little or no loss of motion in its operation.

Another object of this invention is to provide a brake for automotive vehicles and the like having greater braking surface in proportion to its diameter than any other brake now in use.

Still another object of this invention is to provide a brake for automotive vehicles and the like having a simplified structure that permits greater ease in the machining out of its drum than is now possible with drums now in use.

Other and further objects and advantages of this brake for automotive vehicles and the like will be hereinafter described, and the novel features thereof defined in the appended claims.

Referring to the drawing.

Similar reference characters refer to similar parts throughout the several views of the drawing.

Figure 1:
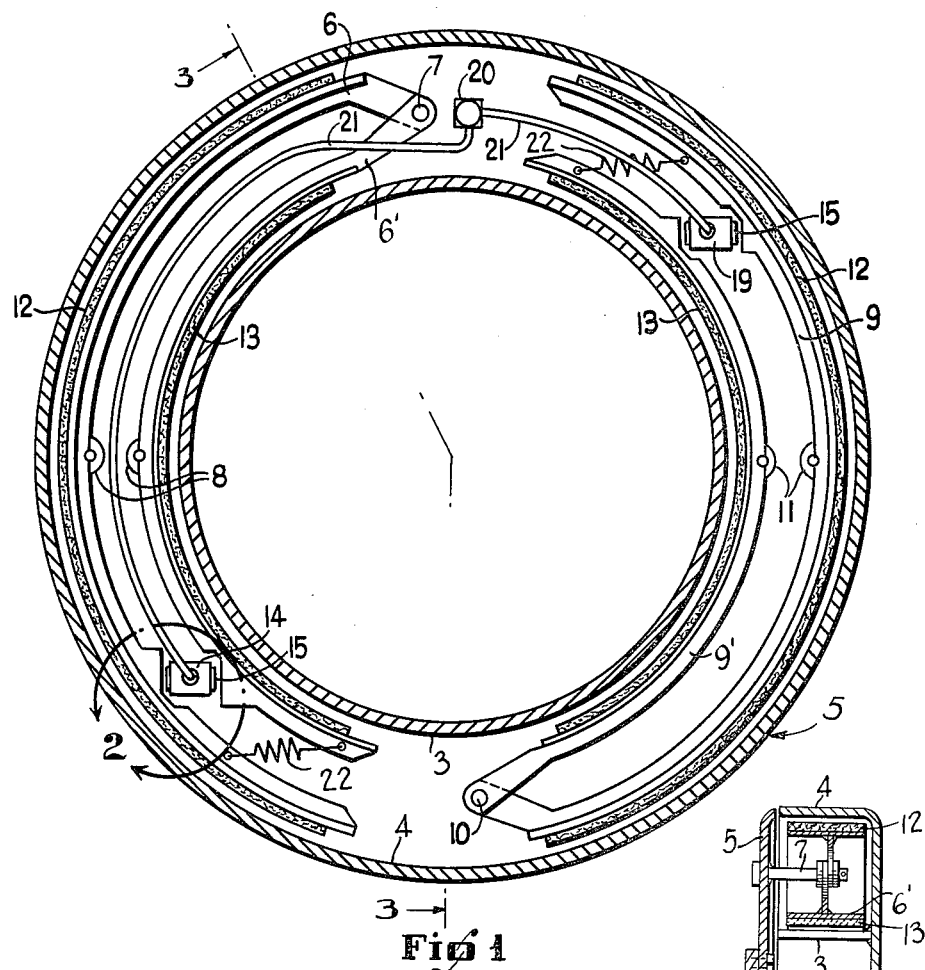
FIGURE 1 is a sectional view of this invention.
Figure 2:
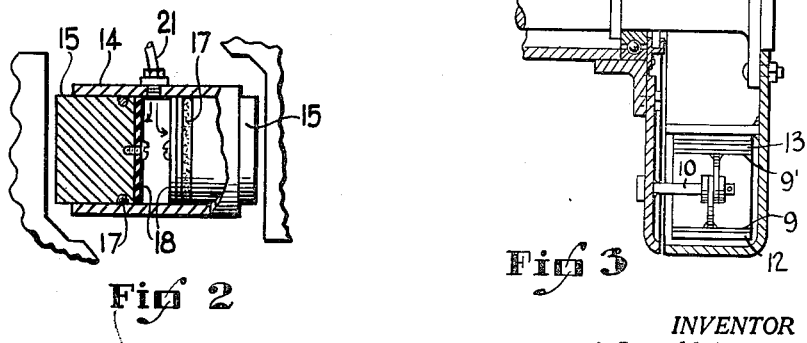
FIGURE 2 is an enlarged view of that portion of this invention which is enclosed within the arrowed circle and the numeral 2 on FIGURE 1.
Figure 3:
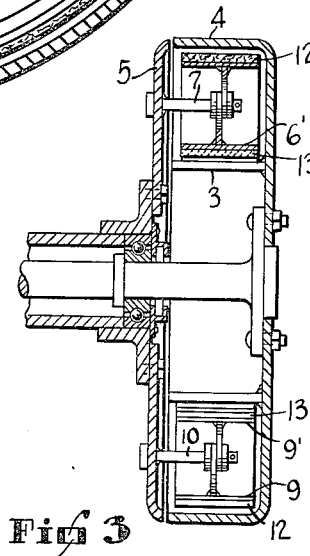
FIGURE 3 is a sectional view taken substantially along the line 3—3 of FIGURE 1 as viewed in the direction indicated by the arrows.

Having reference now to the drawing in detail, there is generally indicated by the character 5 a brake drum having concentric braking surfaces 3 and 4. Brake shoes 6 and 6' have one end secured by an anchor pin 7 to the usual support plate or shield, and a pair of centrally located stops 8 which are mounted by eccentric mechanism for adjustment purposes. Like brake shoes 9 and 9' each having one end secured by an anchor pin 10 to the aforesaid support plate or shield, and a like pair of centrally located stops 11 are located diametrically opposite the first mentioned stops 8. Each brake shoe 6 or 9 is provided with an outer liner 12 and each brake shoe 6' or 9' is provided with an inner liner 13, as clearly shown in FIGURE 1 of the appending drawing. A wheel cylinder 14 is located on the usual support plate or shield between the brake shoes 6 and 6' against which the pistons 15 act when the brake is applied, as will be hereinafter described. The pistons 15 are located one in each end of the wheel cylinder 14 in which they, the aforesaid cylinders, are snugly fitted by means of the O rings 17 and the rubber washers 18 that are on the inner end of each piston, as clearly shown in FIGURE 2 of the appended drawing. A like wheel cylinder 19, containing identical parts as that of the wheel cylinder 14 and therefore indicated by the same reference numerals, is located between the brake shoes 9 and 9'. The wheel cylinders 14 and 19 are connected to a common fitting 20 by means of hydraulic or air line 21. The fitting in turn is, of course, connected to the hydraulic or air line braking system of the vehicle on which the brake is mounted. This last mentioned hydraulic or air line is not shown in either view of the appended drawing, nor is the ribbed construction of the aforesaid brake shoes 6 and 9, which are ribbed in order to properly dissipate the heat and thus increase the life of the brake. The spring washer that is placed on each anchor pin 7 and 10 has also been left out of the drawing for reason of clarity. The springs 22 normally hold the brake shoes against stops 8 or 11.

From the foregoing it will now be seen that there is herein provided a brake for automotive vehicles and the like which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

What I now claim as my invention is:
1. A vehicle brake comprising
an outer cylindrical brake drum having a brake shoe contacting surface on the inner periphery thereof;
an inner cylindrical brake drum coaxial with said outer cylindrical brake contacting surface and having a brake shoe contacting surface on the outer periphery thereof;
a shield operably connected with said inner and outer brake drums covering at least the area bounded by the edges of said inner and outer brake drums;
a pivot pin secured to said shield and extending between said brake shoe contacting surfaces of said inner and outer cylindrical brake drums;
a first brake shoe comprising an arcuate portion carrying a brake lining substantially coaxial with and adjacent said inner brake drum and an outwardly diagonally extending support secured to one end of said arcuate portion and pivotally mounted on said pivot pin;
a second brake shoe comprising an arcuate portion carrying a brake lining substantially coaxial with and adjacent said outer brake drum and an inwardly diagonally extending support secured to one end of said arcuate portion and pivotally mounted on said pivot pin, said first and second brake shoes defining an open space between said shoes;
spring means secured between said first and second brake shoes for biasing said brake shoes towards each other and away from said brake drums;
and means operably connected with said shield between said brake shoes for urging said brake shoes to swing oppositely about said pivot towards said brake drums.
2. The structure of claim 1 wherein
said arcuate portion of said first brake shoe carries a shoulder defining a first straight edge facing said open space between said inner and outer brake shoes;
said arcuate portion of said second brake shoe carries a shoulder defining a second straight edge facing said open space confronting and parallel to said first straight edge; and
said means urging said brake shoes towards each other comprises a fluid cylinder mounted on said shield and having first and second transverse longitudinally aligned reciprocable pistons, said first straight edge being in the path of said first reciprocable piston and said second straight edge being in the path of said second reciprocable piston, whereby simultaneous actuation of said pistons pivots said brake shoes about said pivot away from each other into engagement with the adjacent brake shoe contacting surfaces of said inner and outer brake drums.

References Cited by the Examiner

UNITED STATES PATENTS

| | | | |
|---|---|---|---|
| 1,511,976 | 10/24 | Markham | 188—76 |
| 1,619,970 | 3/27 | Christensen | 188—152 |
| 1,785,203 | 12/30 | Minium | 188—75 |
| 1,913,932 | 6/33 | La Brie | 188—152 |
| 2,208,293 | 7/40 | Hayes | 188—78 |

FOREIGN PATENTS 838,703  5/52  Germany.

MILTON BUCHLER, Primary Examiner.

RALPH D. BLAKESLEE, Examiner.